Feb. 10, 1953 — T. N. SPENCER — 2,627,703
FLOW RESPONSIVE PRESSURE REGULATOR
Filed May 13, 1948 — 4 Sheets-Sheet 1

INVENTOR.
THEODORE N. SPENCER.
BY
Lockwood, Goldsmith & Galt
ATTORNEYS.

INVENTOR.
THEODORE N. SPENCER.

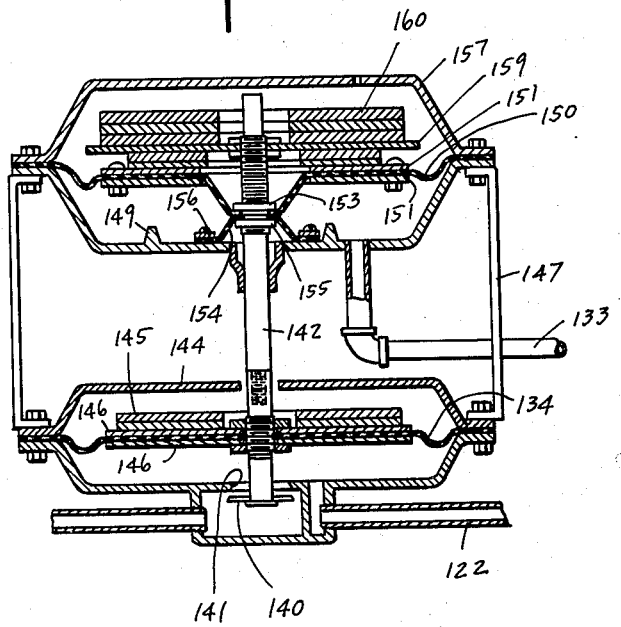

Feb. 10, 1953 T. N. SPENCER 2,627,703
FLOW RESPONSIVE PRESSURE REGULATOR
Filed May 13, 1948 4 Sheets-Sheet 4

INVENTOR.
THEODORE N. SPENCER.
BY
Lockwood Goldsmith & Galt.
ATTORNEYS.

Patented Feb. 10, 1953

2,627,703

UNITED STATES PATENT OFFICE 2,627,703

FLOW RESPONSIVE PRESSURE REGULATOR

Theodore N. Spencer, Muncie, Ind.

Application May 13, 1948, Serial No. 26,834

4 Claims. (Cl. 50—10)

This invention relates to a pressure volume fluid control system for automatically maintaining relatively constant pressure at points in a piping system remote from the control device with variable volumetric demands through the system.

This is desirable in certain piping systems because a constant pressure helps at the average point of exodus from the system more than at the control point or point of entrance to the system. To illustrate, in a gas utility piping system it is desirable to deliver as nearly constant pressure to the average customer as practical so that the average appliance operates in a uniform fashion. One district regulator supplying hundreds or possibly thousands of customers through miles of main piping, can best perform its pressure regulating function if it maintains relatively constant pressure at an average distance from itself rather than at its own outlet.

To achieve this purpose, it is necessary to supply extra pressures during high demand periods so as to offset the friction losses of the piping system. These extra pressures should be proportionate to the friction losses and therefore be proportionate to the volume of flow. There must be safe maximum and minimum limits of pressure supplied.

Fortunately the variables, other than volume, affecting friction loss, such as pipe size, density and viscosity of fluid remain constant for considerable periods of time. It is, however, desirable that the device be adjustable to compensate for variations when they occur.

The present invention is of the differential pressure operable type, that is differential pressure is the variable used for control purposes.

The invention is disclosed as incorporated in a supply line, subject to variable demand, the control being applied to that line to insure proper pressure for any volume drawn, and within the limits of the supply to the control.

While the invention is primarily intended for use upon supply lines such as a tap from a cross-country or intra-urban higher pressure gas line to an industrial or urban variable load, it can when desired and properly constructed, be applied to the control of any kind of fluid supply system wherein approximate constant pressure is desired for variable load demand at the average point of delivery to customers.

The problem of supply with respect to a readily variable load is that upon excessive demand the average customers' pressure drops below that required or desired, a condition which is allayed by this invention.

A sub-station attendant, can, of course, manually effect proper control of the supply so that none of the aforesaid problems occur provided gauges tell him of remote pressure conditions.

The object of the present invention is to automatically accomplish what once could be done only by continuous manual supervision and more recently by the use of automatic devices which utilize more complex parts, all subject to failure, difficult to understand, adjust, and maintain.

The feature of the present invention resides in utilizing a change in differential pressure to automatically control a supply line in the manner described.

Other objects and features of the invention will be set forth more fully hereinafter.

The full nature of the invention will be understood from the accompanying drawings and the following description and claims.

In the drawings

Fig. 4 is a view similar to Fig. 2 and of a modified form of loader and control mechanism, same being shown in Fig. 3.

Fig. 7 is an enlarged central sectional view of the differential pressure responsive unit illustrated in Fig. 6.

Figure 1:
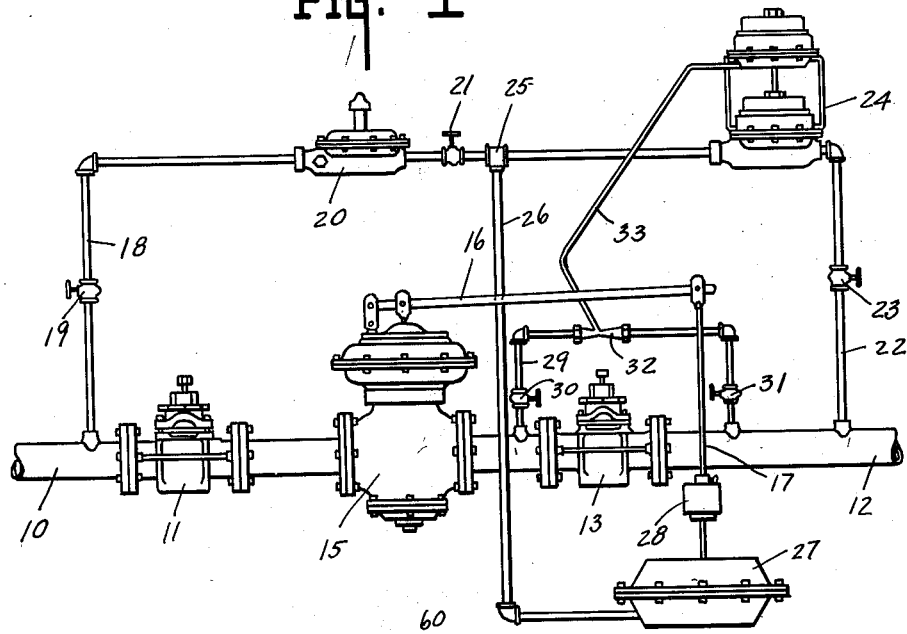
Fig. 1 is a diagram of a typical single district pilot controlled system with the invention included therein.
Figure 2:
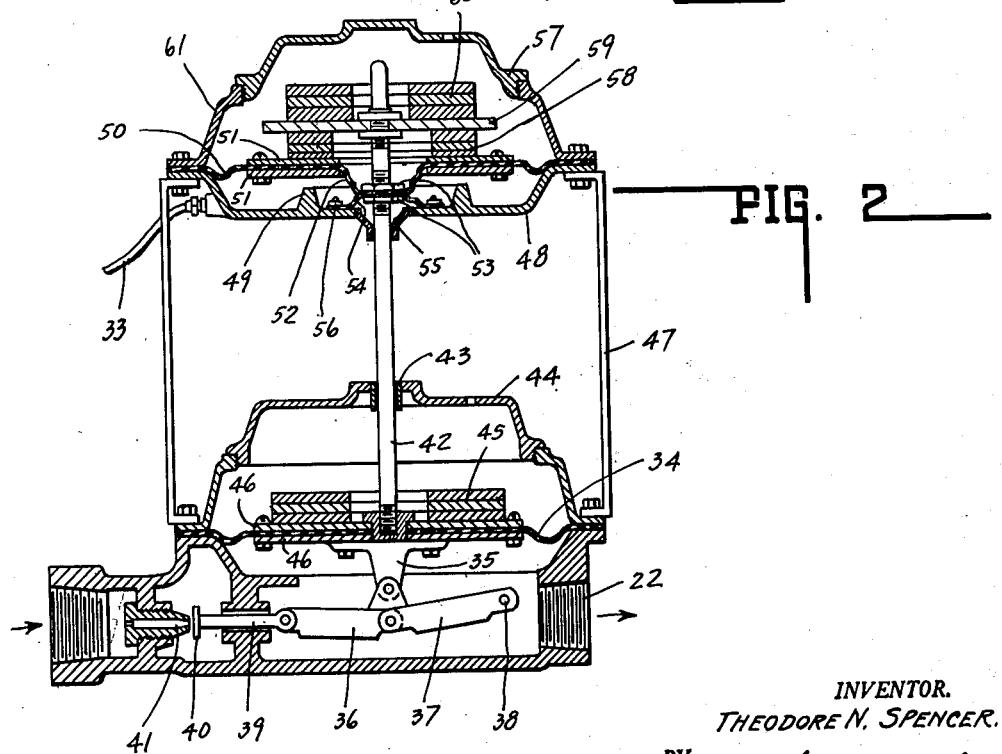
Fig. 2 is an enlarged central sectional view of the auxiliary loader and control mechanism embodying the invention.

In Figs. 1 and 2 of the drawings there is illustrated a downstream embodiment of the invention having the inlet main 10 controlled by a manually adjustable inlet valve 11. An outlet or load main 12 includes a manually adjustable outlet valve 13. Interposed between these valves and mains is a "single district" pilot controlled main regulator valve 15 of beam controlled type with beam 16 controlled as at 17.

A by-pass around the aforesaid valves includes line 18 having upstream valve 19 and auxiliary regulator 20 downstream thereof. Needle valve 21 is downstream of said regulator. The by-pass includes the outlet main take-off line 22 with valve 23 upstream therein. Also upstream thereof is the auxiliary loader device 24. These two lines 18 and 22 have junction at 25 and line 26 therefrom leads to the dash pot structure 27, the active stem 17 of which is adjustably weighted at 28.

A by-pass around outlet valve 13 includes line 29 with valves 30 and 31 therein. Therebetween in said line 29 is venturi 32 and leading therefrom is line 33 to the auxiliary loader 24.

Referring to Fig. 2 the auxiliary loader, designated generally by numeral 24 in Fig. 1, includes a control diaphragm 34 carrying support 35 to which is pivoted sequentially or end to end connected links 36—37, the latter being pivoted at 38 and the former pivoted to valve stem 39 having valve cover 40 disposed adjacent the nozzle 41. Thus after initial adjustment diaphragm flexing regulates movement of valve cover 40 for control purposes.

Diaphragm 34 has rigidly secured to it, and centrally thereof the stem 42 guided at 43 by cap 44. Disposed upon said diaphragm are a suitable number of maximum and minimum control weights 45. The diaphragm includes the discs or pans 46.

Standards 47 suitably support the loader bowl or base 48 having diaphragm stop 49 therein. An equivalent stop may be provided elsewhere. This bowl is closed by diaphragm 50 provided with discs or pans 51. The diaphragm 50 is secured by flexible joint 52 and nuts 53 in fluid tight adjusted relation to the stem 42. A similar joint 54 is secured by nut 53 to said stem. Herein the joints abut and the nuts oppose each other. The joint 54 is secured at 56 to bowl 48 to seal same. Portion 55 serves as a stem guide. Line 33 aforesaid constitutes the pressure line to said bowl.

Above the diaphragm 50 within housing 57—61 and below the weight pan 59 is disposed the minimum control weights 58. The stem weight pan 59 is adjustable upon stem 42 within said housing. Carried by the pan 59 are a series of maximum control weights 60 which may be varied, depending upon the needs of the system, and which variation in the weights 60 would reset the maximum pressure, and also affect the minimum pressure.

Adjustments are made in the apparatus described so that when the absolute pressure under diaphragm 50 is in excess of that necessary to uphold its own weight and loading weights 58, the force of said pressure will assist, through the stem, the diaphragm 50 master controls the main diaphragm 34 to offset the thrust of the loading weights 45 and 60 or other loadings. When the absolute pressure under diaphragm 50 is insufficient to hold up its loading and attached weight, the fluid tight joints 52 and 54 permit the diaphragm to drop down relatively free of the stem 42. At this time the full load or thrust of all other movable weights and parts is borne by control diaphragm 34 and any further action causes no increase in thrust upon the latter.

Referring to Fig. 1 when no fluid is flowing through the regulator 15 the pressures under the two diaphragms 34 and 50 are equal and they share the burden of the loading in structure 24. As the flow increases the pressure at the Venturi throat 32 decreases, hence the pressure under the diaphragm 50 decreases so that more of the loading is assumed by diaphragm 34 which causes the valve 40 to be actuated to open up the outlet 41 to produce a lower control pressure imposed at junction 25 and on device 27. Lowering the control pressure at junction 25 and on device 27 then results in lowering the rod 17 with its weights 28 and the beam 16, thereby opening the valves in regulator 15.

As the load on outlet line 12 increases a point will be reached where the pressure under diaphragm 50 will be insufficient to uphold the loading directly imposed upon it. The diaphragm 50 thus is depressed and will be free of the stem, weight pan 59, and weights 60. All weights carried by the stem are now supported by diaphragm 34 which is the maximum loading condition that can occur. At this time diaphragm 50 engages stops 49. Thus this diaphragm 50 is limited in its downward travel so that no downward pull on stem 42 can be exerted by diaphragm 50.

Whenever the load decreases the reverse of the foregoing action takes place. It is apparent, therefore, that fluid under pressure is supplied by the supply line 10 at a relatively high variable pressure and is, therefore, being supplied to the load line 12. We will assume that load demand by the load line 12 is decreased. As a result, fluid pressure against diaphragm 34 increases raising diaphragm 34 and tending to close the valve 40. This by-passes the greater pressure into the structure 27 which operates to close the control valve 15 to reduce the flow of fluid to load line 12. A decrease in flow to load line 12 will decrease flow to the venturi 32. As a result, pressure at the Venturi throat increases. With the increase of pressure against diaphragm 50, when this pressure overcomes the load 58 on diaphragm 50, engagement will be made with the plate 59; and part of the combined load of weights 60 and 45 will be carried by the diaphragm 50. In other words, the maximum load on diaphragm 34 will be divided between diaphragms 34 and 50.

Figure 3:
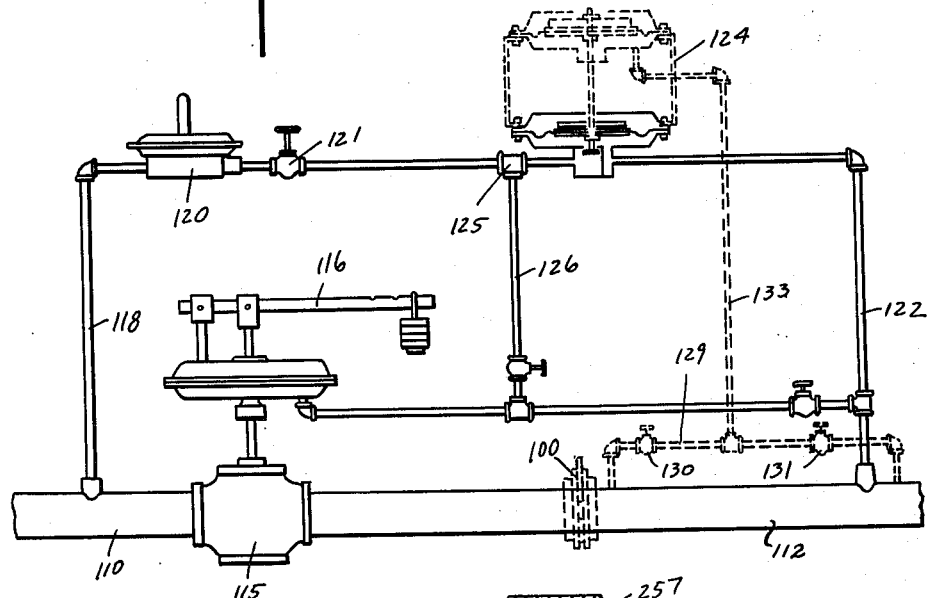
Fig. 3 is a view similar to Fig. 1 and of a modified system with the invention included therein.

Reference will now be had to Figs. 3 and 4. Herein numerals of the one hundred series indicate parts identical or similar to those indicated by primary numerals in Figs. 1 and 2.

Major differences are in Fig. 4 the valve is of direct stem connected type; in Fig. 3 the main regulator has no dashpot, the Venturi structure is substituted by a pair of needle valves, the control take off being taken between said valves. Herein in lieu of the outlet valve there may be included an orifice structure 100 and same must be disposed upstream of line 122 in the line 112 a distance at least six times the diameter of line 112. Other changes will be obvious from a comparison of Figs. 1 and 3.

The operation of this form is essentially the same basically as that previously described for the form illustrated in Figs. 1 and 2.

Figure 5:
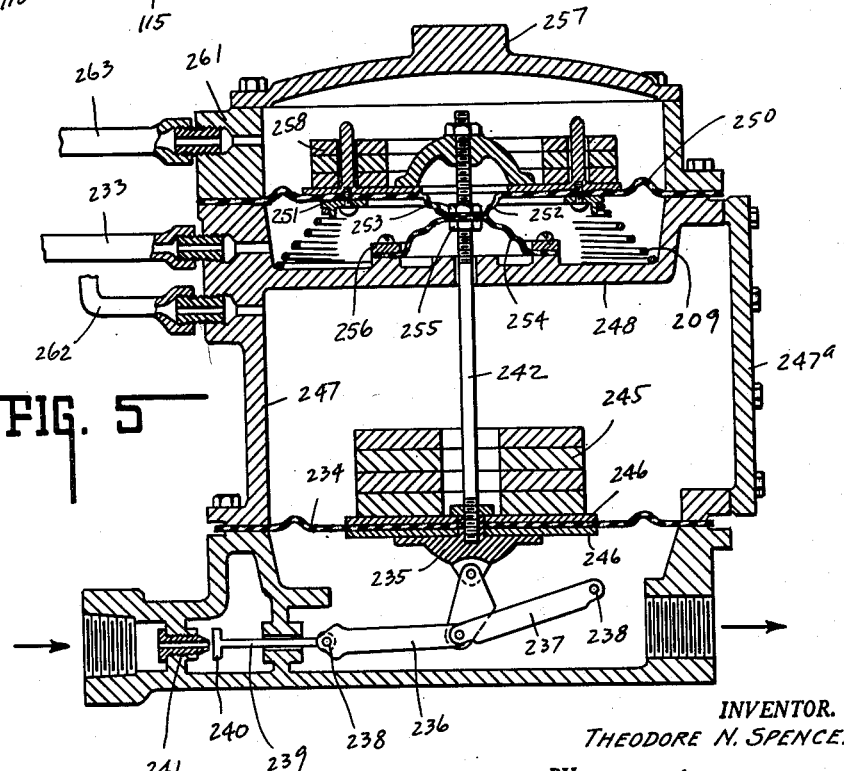
Fig. 5 is a view similar to Fig. 2 and 4 and of a further modified form of loader and control mechanism.

Reference will now be had to Fig. 5. Herein numerals of the two hundred series indicate parts like or similar to parts shown in Figs. 2 and 4 and designated by the primary and one hundred series numerals, respectively.

In this form of the invention the legs 47 of Fig. 2 or legs 147 of Fig. 4 are replaced by body portion 247 and cover plate 247a. The resulting chamber is vented at 262. Herein the portion above the upper diaphragm is sealed as shown and a differential pressure line 263 connects to the resulting chamber above diaphragm 250.

The other end of line 263 connects to the higher pressure side of the differential producer such as line 29 in Fig. 1, or 129 in Fig. 2. The chamber below said diaphragm is sealed as at 254 and the lower differential pressure line 233 connects thereto.

Using the differential pressure line 263 takes advantage of a proportionate pressure rise in line 263 to the pressure reduction in line 233 to give greater pressure differential across diaphragm 250 for the same pressure differential across a valve similar to valve 13 or 313. Note herein the diaphragm supporting spring 209, which is provided to give an upward thrust to the diaphragm at no demand in line 12. This modification also permits use of light, flexible diaphragm material when high pressure exists in lines 263 and 233, because only a slight difference in pressure between 263 and 233 tends to burst it.

Essentially this form of the device operates as previously described, due regard being had to the additional pressure application at 263 to diaphragm 250.

Figure 6:
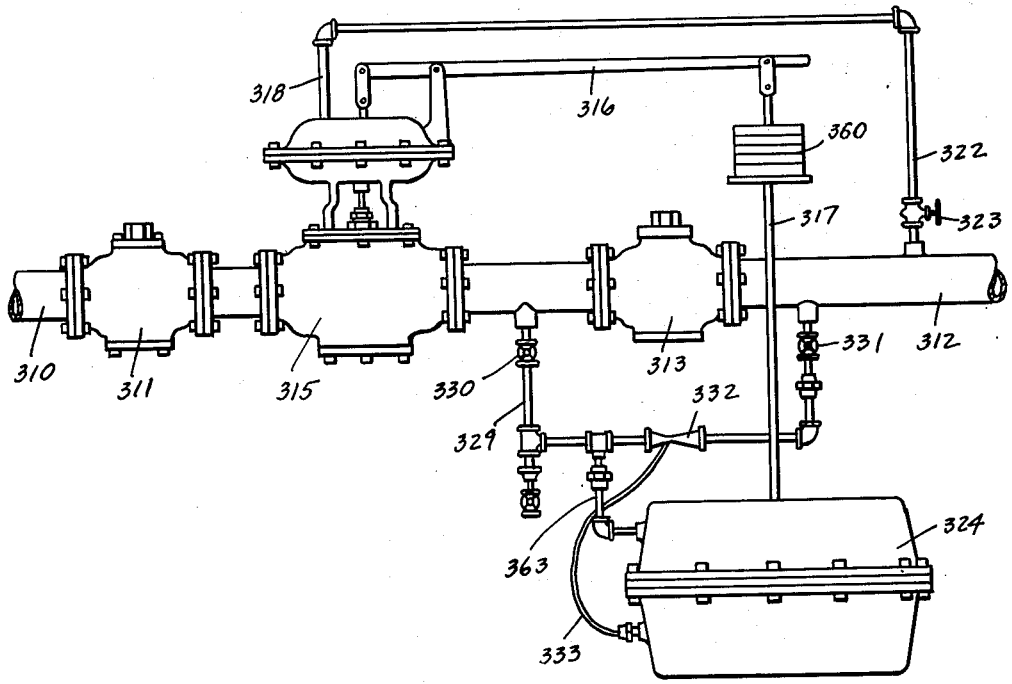
Fig. 6 is a view similar to Figs. 1 and 3 and of a downstream disposed embodiment of the invention, same including a venturi therein.

Reference will now be had to Figs. 6 and 7, in which no pilot control is used on the main regulator valve 315.

In this form of the invention, as the differential across diaphragm 350, see Fig. 7, increases with increased flow in line 312, see Fig. 6, less upward thrust is transmitted to rod 317. Thus is imposed directly on the lever 316 a greater burden induced by the weights 360 with decreased support from spring 364, and a higher pressure control results.

Spring 364, see Fig. 7, is shown compressed to a small fraction of its free length and when thus compressed it provides an upward thrust to rod 317 when the differential across the diaphragm and weights 358 are insufficient to overcome the spring action. When the said differential and weights 358 are sufficient to overcome the spring thrust the diaphragm 350 and parts resting thereon will drop free of the stem 317 affording maximum loading conditions.

Dampening valves in lines 33, 133, 233, 333, 263, 363, and 26 may be desirable to avoid sudden excessive actions of the controls.

It will be noted that herein in at least one embodiment of the invention there is disclosed an orifice plate and in a second embodiment of the invention there is disclosed a Venturi structure. These two are representative of several different types of structures that can be included in a fluid flow line which will provide differential pressure between two longitudinal spaced portions in that line. This condition devoid of orifice plate or venturi is shown by the dotted lines in Fig. 3 wherein, insofar as pressures are concerned, downstream of the plate 100, there is a differential pressure between the upstream and downstream takeoffs to the line 133. Therefore, the present invention is not of necessity limited to cooperation with an orifice plate including discharge line or a Venturi associated discharge line but these devices or any other device which produces differential proportionate to line flow may be employed whenever and wherever it is desired to obtain differential pressure for control purposes.

While herein, as shown more particularly in Figs. 1, 3, and 6, the means for providing differential pressure responsive to flow effects is shown disposed downstream of the main regulator valve, the present invention can be applied to a regulated system wherein the differential effect is taken upstream of the main regulator valve.

The present invention also, see Figs. 1 and 3, by virtue of lines 13 and 22 provides a relay system for increasing the power to be applied for main regulator valve operation, such power being controlled by the differential pressure responsive device of the present invention; in other words, providing what might be termed substantially fingertip control notwithstanding the power requirement necessary to actuate or physically operate the regulator valve. The use of such relay system eliminates the necessity for utilizing an enormous size differential pressure device of large power requirements for the regulator valve when the size of such device would be commercially impractical. Expressed otherwise, the differential pressure responsive device constitutes in the present system, a pilot control for the power to operate the regulator valve in accordance with the differential pressure demands of the system. This invention, accordingly, maintains the system at the distributing end at a constant pressure regardless of the variable load demands upon the system.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a fluid control system having a pressure fluid supply line and a load line supplied therefrom, means for controlling the supply of fluid from said supply line to said load line, a pressure responsive device loaded to permit maximum pressure in said load line and responsive to variations in the pressure developed in said load line, a secondary device connected to said pressure device responsive to variations in the flow through the load line to decrease the maximum loading on the first said device by an amount which varies inversely to the flow in the load line, and means responsive to said variations in said pressure to actuate said supply controlling means.

2. In a fluid control system having a pressure fluid supply line and a load line supplied therefrom, means for controlling the supply of fluid from said supply line to said load line, a pressure responsive device loaded to permit maximum pressure in said load line and responsive to variations in the pressure developed in said load line, a bypass in said load line, a secondary device operatively connected with said pressure responsive device and having a pressure connection with said bypass responsive to the flow therethrough to decrease the maximum loading on the first mentioned device by an amount which varies inversely to the flow in the bypass, and means responsive to said variations in said pressure to actuate said supply controlling means.

3. In a fluid control system having a pressure fluid line and a load line supplied therefrom, means for controlling the supply of fluid from said supply line to said load line, a first bypass from said supply line to said load line, a fluid pressure responsive device responsive to fluid pressure in the load line and loaded to control maximum pressure in said load line, a second bypass in said load line, a secondary fluid pressure responsive device operatively connected to said first mentioned fluid responsive device and having a pressure connection with said second bypass to decrease the maximum loading on the first said device by an amount which varies inversely to the flow in the second bypass, and means responsive to said variations in said pressure to actuate said supply controlling means.

4. In a fluid control system having a pressure fluid supply line and a load line supplied therefrom, means for controlling the supply of fluid from said supply line to said load line, a fluid pressure responsive device loaded to permit maximum pressure in said load line and responsive to variations in the pressure developed in said load line, means for producing a differential pressure in one of said lines, a secondary pressure responsive device operatively connected to said fluid pressure responsive device responsive to the differential pressure in said differential pressure producing means to decrease the maximum loading on the first said device by an amount which varies inversely to the flow in the line including the differential pressure producing means, and means responsive to said variations in said pressure to actuate said supply controlling means.

THEODORE N. SPENCER.

REFERENCES CITED

The following references are of record in the file of this patent:

UNITED STATES PATENTS

| Number | Name | Date |
| --- | --- | --- |
| 1,132,593 | Lloyd | Mar. 23, 1915 |
| 1,199,567 | Kellogg | Sept. 26, 1916 |
| 1,732,012 | Groble | Oct. 15, 1929 |
| 1,788,429 | Groble | Jan. 13, 1931 |
| 2,013,222 | Thomas | Sept. 3, 1935 |
| 2,071,871 | Cleveland | Feb. 23, 1937 |
| 2,230,914 | Sherman | Feb. 4, 1941 |
| 2,237,070 | Cleveland | Apr. 1, 1941 |
| 2,308,187 | MacLean | Jan. 12, 1943 |
| 2,309,848 | King | Feb. 2, 1943 |
| 2,389,412 | Carlton | Nov. 20, 1945 |
| 2,389,413 | Carlton | Nov. 20, 1945 |

FOREIGN PATENTS

| Number | Country | Date |
| --- | --- | --- |
| 522,665 | Germany | of 1930 |
| 636,879 | Germany | of 1936 |